UNITED STATES PATENT OFFICE.

CARL AUGUST LOUIS WILHELM WITTER, OF HAMBURG, GERMANY, ASSIGNOR TO THE STRAITS TRADING CO., LTD., OF SINGAPORE, STRAITS SETTLEMENTS.

PROCESS OF EXTRACTING TIN FROM TIN-SLAG.

No. 801,290.          Specification of Letters Patent.          Patented Oct. 10, 1905.

Application filed December 1, 1904. Serial No. 235,105.

*To all whom it may concern:*

Be it known that I, CARL AUGUST LOUIS WILHELM WITTER, a subject of the German Emperor, and a resident of Hamburg, in the German Empire, have invented new and useful Improvements in Processes of Extracting Tin from Tin Slags, of which the following is a specification.

This invention relates to the process of extracting and utilizing tin from slags of molten tin ores and other stanniferous materials; and it consists in subjecting the same to a reducing smelting with lead, lead ores, or other plumbiferous materials, either *per se* or in the presence of sulfur or sulfurous substances.

In the smelting of tin ores and other stanniferous materials to reduce the same to tin, slags are obtained which even after repeated smelting in reverberatory or blast furnaces still contain a certain percentage of tin in the form of ferrous stannate or silicate of tin. Heretofore there has been no profitable way discovered of separating a further part of the tin from such repeatedly reduced and purified slags, and accordingly in the tinworks these slags, containing as a rule from three to five per cent. of tin, are thrown on the wastheap. Under the present invention, however, the tin content of the slags can with profit be extracted even down to 0.5 per cent. or less, the slags—for instance, rich slags from the tin-smelting—being smelted and reduced in a blast-furnace adapted as a hearth-furnace together with lead, lead ores, or other plumbiferous materials, and in this way a composition of lead and tin is obtained corresponding to the quantities of lead used and the amount of tin reduced from the slags. The lead serves then as a solvent for the tin reduced from the slags.

As the slags without exception contain iron, in the reduction of the tin a greater or less quantity of iron is also separated, and for the obtainment of a poor slag endeavor must be made to separate the iron. The reduced iron, however, very quickly settles on the hearth, the slags remain rich in tin, and after a short time the furnace must be allowed to cool. In order, therefore, to avoid this inconvenient action of separating the iron, under the invention there is added to the slags on smelting, together with the lead, a certain quantity of sulfur or material yielding sulfur corresponding to the iron to be separated, so that the iron as it separates is instantly bound with the sulfur and on drawing off the alloy can be removed as a matte from the furnace. The alloy of tin and lead so obtained contains a very large proportion of lead and could hardly be of commercial value if the tin content does not amount to at least forty to fifty per cent. Accordingly the alloy is melted in a reverberatory furnace (hearth or refining furnace) and when the temperature is such that the molten liquid shows a red glow is subjected to the action of air, a blast of air being preferably blown on the molten mass of metal. The tin contained in the alloy is oxidized; but at the same time a certain portion of the lead is oxidized as well. An oxid mixture containing a high percentage of tin is thus obtained which can be drawn off the surface of the metal bath and then again reduced in a reverberatory or blast furnace and smelted to form an alloy containing a large proportion of tin.

Having fully described my invention, what I claim, and desire to secure by Letters Patent, is—

1. The process of treating tin slags, which consists in smelting the slags with plumbiferous material, substantially as described.

2. The process of treating tin slags, which consists in smelting the slags with lead, substantially as described.

3. The process of treating materials containing iron and a small percentage of tin, which consists in smelting the material with plumbiferous material and sulfur-bearing substances, substantially as described.

4. The process of treating tin slags containing iron, which consists in smelting them in the presence of a plumbiferous material and sulfur, substantially as described.

5. The process of treating tin slags containing iron, which consists in smelting them in the presence of lead and sulfur, substantially as described.

6. The process of treating tin slags containing iron, which consists in smelting them in the presence of lead and a sufficient quantity of a sulfur-bearing material to combine with the iron to form sulfid, substantially as described.

7. The process of treating tin slags containing iron, which consists in smelting them in the presence of lead and sufficient sulfur to combine with the iron to form sulfid, substantially as described.

8. The process of treating tin slags, which consists in smelting them in the presence of plumbiferous material to form a product rich in lead, oxidizing the product to form on the surface of the charge a mixture rich in tin, removing this mixture and reducing the same to form a product rich in tin, substantially as described.

9. The process of treating tin slags containing iron, which consists in smelting them in the presence of lead and sulfur to form a product rich in lead that contains the tin, oxidizing the product so formed to form on its surface a mixture rich in tin and finally removing this mixture and reducing it with carbon to obtain a product rich in tin, substantially as described.

CARL AUGUST LOUIS WILHELM WITTER.

Witnesses:
MAX KAEMPFF,
E. H. L. MUMMENHOFF.